(12) United States Patent
Saunamäki (10) Patent No.: US 10,224,723 B2
(45) Date of Patent: Mar. 5, 2019

(54) RADIO FREQUENCY FILTER FOR WIRELESS POWER SYSTEM

(71) Applicant: Intel Corporation, Santa Clara, CA (US)

(72) Inventor: Esa Ilmari Saunamäki, Virrat (FI)

(73) Assignee: Intel Corporation, Santa Clara, CA (US)

( * ) Notice: Subject to any disclaimer, the term of this patent is extended or adjusted under 35 U.S.C. 154(b) by 394 days.

(21) Appl. No.: 14/865,777

(22) Filed: Sep. 25, 2015

(65) Prior Publication Data
US 2017/0093171 A1    Mar. 30, 2017

(51) Int. Cl.
| | |
|---|---|
| *H01F 27/42* | (2006.01) |
| *H01F 37/00* | (2006.01) |
| *H01F 38/00* | (2006.01) |
| *H02J 5/00* | (2016.01) |
| *H02J 17/00* | (2006.01) |
| *H02J 7/02* | (2016.01) |
| *H02J 50/10* | (2016.01) |
| *H02J 50/70* | (2016.01) |
| *H01F 38/14* | (2006.01) |
| *H04B 5/00* | (2006.01) |

(52) U.S. Cl.
CPC .............. *H02J 5/005* (2013.01); *H01F 38/14* (2013.01); *H02J 7/025* (2013.01); *H02J 17/00* (2013.01); *H02J 50/10* (2016.02); *H02J 50/70* (2016.02); *H04B 5/0031* (2013.01); *H04B 5/0037* (2013.01)

(58) Field of Classification Search
CPC .......... H03H 11/04; H03H 11/00; H03H 7/01; H02J 7/02; H02J 7/00; H02J 5/00; H02J 17/00; H01F 38/14; H01F 38/16; H04B 1/44; H04B 1/46; H04B 1/00; G04B 47/00; G04B 47/02

USPC .................. 307/104, 149, 109, 82
See application file for complete search history.

(56) References Cited

U.S. PATENT DOCUMENTS

| | | | |
|---|---|---|---|
| 6,686,815 B1* | 2/2004 | Mirshekarl-Syahkal | H01P 1/2053 333/202 |
| 8,131,226 B1* | 3/2012 | Kemmochi | H04B 1/006 333/100 |
| 2009/0002102 A1* | 1/2009 | Tsuzuki | H01P 1/20 333/204 |
| 2010/0238084 A1* | 9/2010 | Deng | H01Q 9/0407 343/770 |

(Continued)

FOREIGN PATENT DOCUMENTS

WO    WO-2015/019106 A2    2/2015

OTHER PUBLICATIONS

Communication dated Feb. 15, 2017 for European Patent Application No. 16185141.5.

*Primary Examiner* — Fritz M Fleming
*Assistant Examiner* — Jagdeep Dhillon
(74) *Attorney, Agent, or Firm* — Schiff Hardin LLP (57) ABSTRACT

Described is a wireless power system. The wireless power system can include a wireless charging coil, a driving circuit connected to the wireless charging coil, and a filter element coupled to the wireless charging coil. The driving circuit can be configured to drive the wireless charging coil at a power transmission frequency. The filter element can be configured to filter one or more interference signal components from the wireless power system.

29 Claims, 10 Drawing Sheets

(56) References Cited

U.S. PATENT DOCUMENTS

| | | | |
|---|---|---|---|
| 2011/0164471 A1* | 7/2011 | Baarman | H02J 7/025 |
| | | | 368/10 |
| 2012/0223589 A1 | 9/2012 | Low et al. | |
| 2013/0181535 A1 | 7/2013 | Muratov et al. | |
| 2014/0097697 A1* | 4/2014 | Cho | G06F 1/26 |
| | | | 307/104 |
| 2015/0236671 A1* | 8/2015 | Smith | H03H 7/01 |
| | | | 327/553 |
| 2015/0372662 A1* | 12/2015 | Niessen | H03H 11/04 |
| | | | 307/104 |
| 2017/0070249 A1* | 3/2017 | Irish | H04B 1/1027 |

* cited by examiner

RADIO FREQUENCY FILTER FOR WIRELESS POWER SYSTEM

BACKGROUND

Field

Aspects described herein generally relate to radio frequency (RF) filters, including RF filters for wireless power coil systems.

Related Art

Wireless power transfer (WPT) or wireless energy transmission is the transmission of electrical power from a power source, such as a power transmitter unit (PTU) to one or more power consuming devices, such as power receiving units (PRUs) without using solid wires or conductors between the source and consuming devices. WPT includes non-radiative and radiative WPT technologies. In radiative (far-field) systems, power is transmitted using, for example, beams of electromagnetic radiation (e.g., microwaves). In non-radiative (near-field) systems, power is transferred using, for example, magnetic fields through inductive coupling between coils, or by electric fields using capacitive coupling between electrodes. For example, in operation, a transmitter device (e.g., PTU) connected to a power source transmits power by electromagnetic fields across an intervening space to one or more receiver devices (e.g., PRU), where it is converted back to electric power and utilized by the receiver device(s).

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1A:
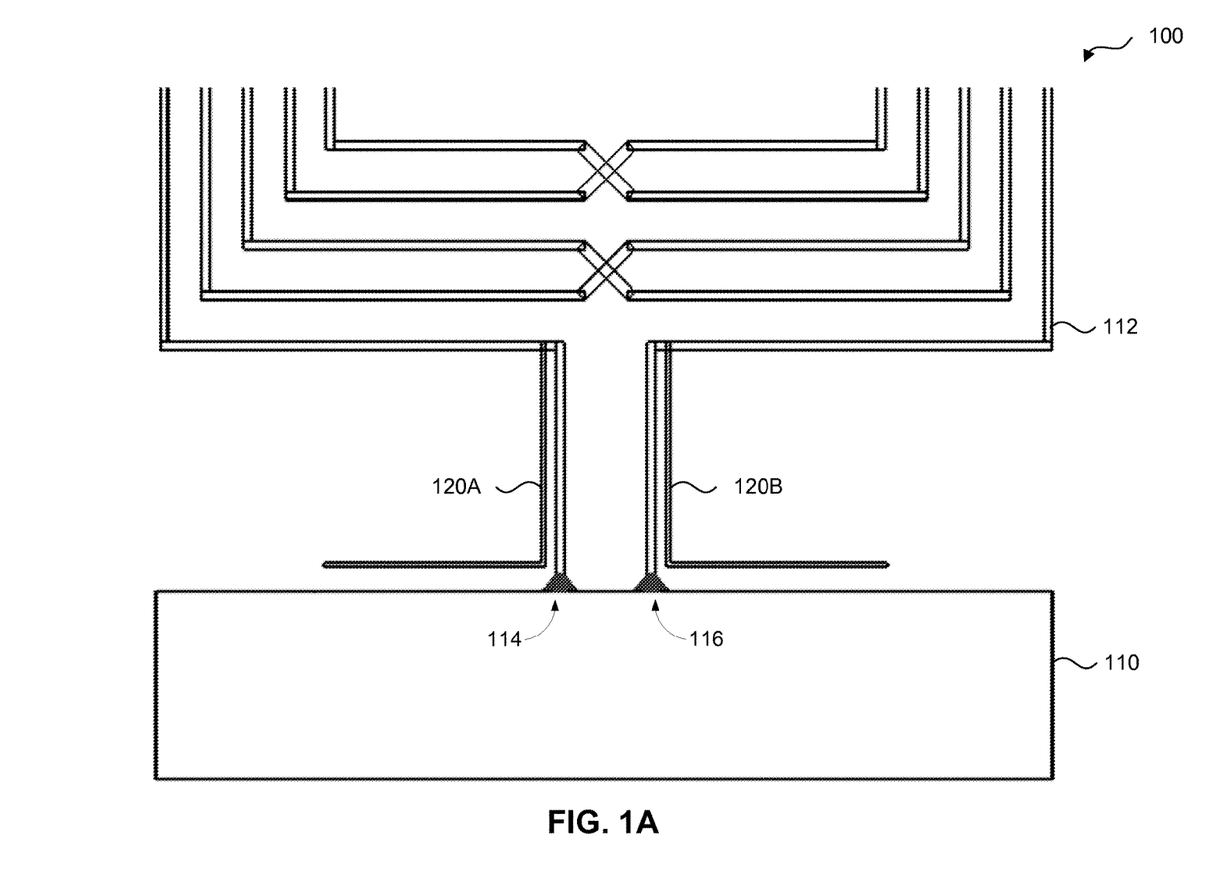
FIG. 1A illustrates a top view of a wireless power system according to an exemplary aspect of the present disclosure.

FIG. 1A illustrates a top view of wireless power system 100 according to an exemplary aspect of the present disclosure. The wireless power system 100 can include a wireless charging coil 112 electrically connected to driving circuit 110.

The driving circuit 110 can include processor circuitry configured to perform power management operations, impedance matching, and/or control and management communications with the power transfer unit. In an exemplary aspect, the driving circuit 110 can be a radio frequency (RF) matching and driving circuit configured to drive the wireless charging coil 112 at a power transmission frequency of, for example, 6.78 MHz. The power transmission frequency is not limited to 6.78 MHz and can be one or more other frequencies as would be understood by those skilled in the relevant arts. In an exemplary aspect, the wireless power system 100 can be configured to wirelessly power one or more power receiving devices using wireless power transfer (WPT). For example, the wireless power system 100 can be configured to conform to one or more WPT interface standards, including, for example, the Rezence WPT interface standard developed by the Alliance for Wireless Power (A4WP), the Power Mat interface standard developed by the Power Mat Alliance (PMA), the Qi WPT interface standard developed by the Wireless Power Consortium, and/or one or more other WPT interface standards as would be understood by one of ordinary skill in the relevant arts. Each of these standards is incorporated herein by reference in their entirety.

The wireless charging coil 112 can include one or more electrically conducting materials (e.g., copper, gold, silver, etc.) in the form of, for example, wires, traces, plates, and/or another coil structure as would be understood by one of ordinary skill in the art. The wireless charging coil 112 can be configured to generate one or more electric and/or magnetic fields for wireless power transfer in one or more frequencies. That is the wireless charging coil 112 can transfer energy between the wireless power system 100 and one or more devices, such as one or more power receiving units (PRUs). In an exemplary aspect, the wireless charging coil 112 is connected to the driving circuit 110 via feeds 114 and 116. In an exemplary aspect, the wireless power system 100 can be configured with a single feed, where one of the feeds 114, 116 is connected to ground. For example, feed 114 can be configured as a feed point to connect the wireless charging coil 112 to the driving circuit 110 while feed 116 is connected to ground, or vice versa. Although not fully illustrated in FIG. 1A, the wireless charging coil 112 can be configured as an electrically conductive coil that extends from feed 114 to feed 116, and vice versa.

In an exemplary aspect, the wireless power system 100 can include one or more filter elements 120 configured to filter one or more frequencies and/or frequency bands. The filter elements 120 can be configured to filter one or more harmonics of the driving circuit 110 and/or filter one or more wireless communication signals (e.g., cellular signals) to reduce and/or prevent the wireless communication signals from interfering with the driving circuit 110. This filtering can reduce and/or prevent intermodulation in the PTU and/or PRU circuits. In an exemplary aspect, the filter elements 120 can filter one or more interference signal components from the power transmission signal path, the coil 112 and/or the coil interface.

The filter elements 120 can include one or more electrically conducting materials (e.g., copper, gold, silver, etc.) in the form of, for example, wires, traces, plates, and/or ground planes. Further, the filter elements 120 can be formed of, for example, nano-carbon materials, composites, and/or structures. In an exemplary aspect, the filter elements 120 can include dielectric materials. The dielectric materials can have any dielectric constant values as would be understood by those skilled in the art. For example, the dielectric materials can have large dielectric constants to reduce the size of the filter elements 120. In an exemplary aspect, the filter element 120 can be included in a mechanical enclosure and/or embodied in an adhesive strip (or other shape) that includes a conductive structure. The adhesive structure can then be placed on the coil structure and/or enclosure.

For example, the wireless power system 100 can include a first filter element 120A and a second filter element 120B, which are configured as band stop filters to filter out one or more frequencies and/or one or more frequency bands. In exemplary aspects that include multiple filter elements 120, the filter elements 120 can be configured to filter out the same frequencies and/or frequency band(s), or different frequencies and/or frequency bands. The filter element(s) 120 can be tuned independently to one or more frequencies and/or frequency band(s) to create band-stop filters configured to filter one or more selected frequencies and/or frequency bands. That is, the filter elements 120 can have one or more resonance frequencies to create band-stop filtering for one or more frequencies and/or frequency bands.

As illustrated in FIG. 1A, a portion of the first filter element 120A can extend substantially parallel to a portion of the second filter element 120B. For example, the first and second filter elements 120A, 120B can be L-shaped, where an extended portion of the L-shaped element 120A is adjacent to and substantially parallel to an extended portion of the L-shaped element 120B.

Figure 1B:
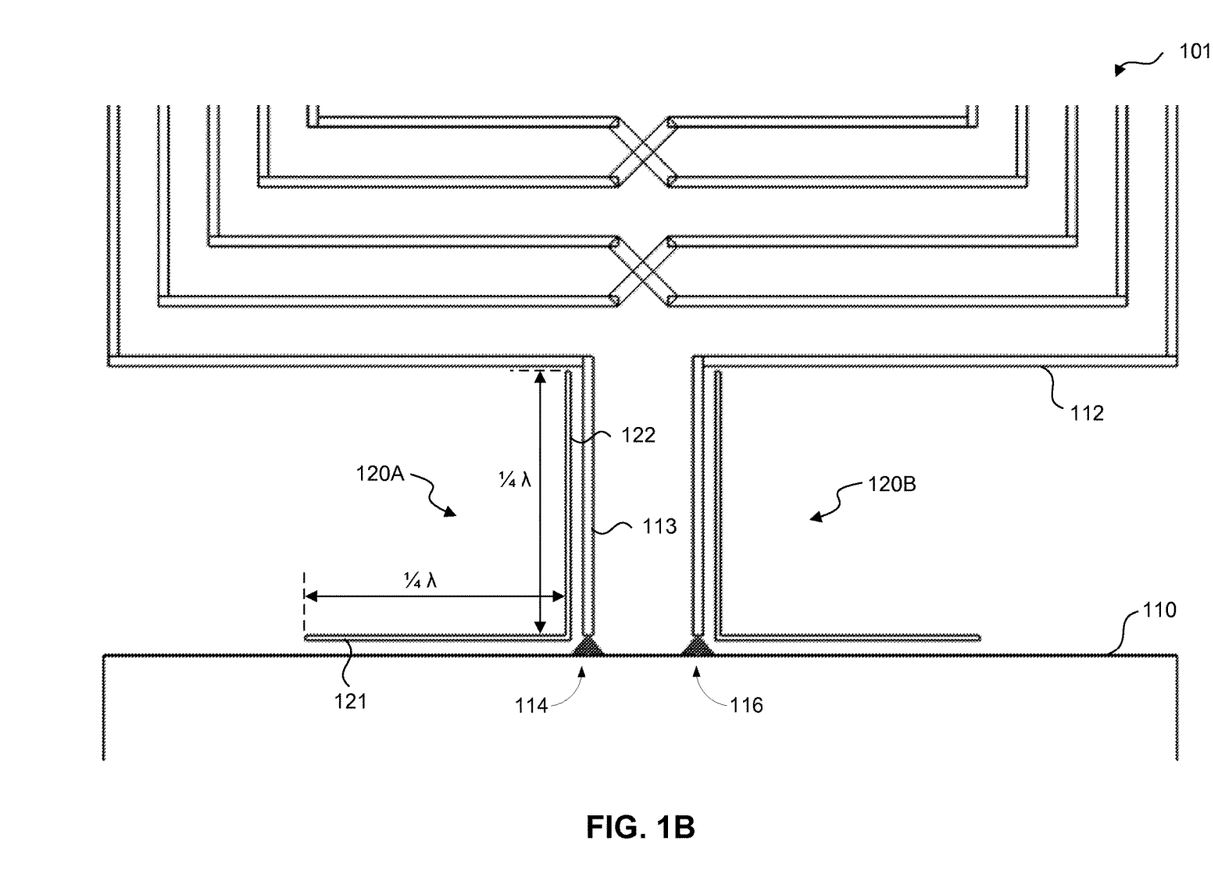
FIG. 1B illustrates a top view of a wireless power system according to an exemplary aspect of the present disclosure.

In an exemplary aspect, one or more of the filter elements 120 has an electrical length $L_E=\lambda/4$, wherein $\lambda$ is the wavelength of signal to be filtered. For example, as illustrated in FIG. 1B, the filter element 120A and/or filter element 120B can be L-shaped, where one or both of the extending portions of the L-shaped filter element has an electrical length of $\lambda/4$. In an exemplary aspect the filter element has an electrical length of $L_E=3\lambda/4$. The filter elements 120 are not limited to L-shaped filters, and the filter elements 120 can be formed as other shapes such as the filter elements 620 and 720 illustrated in FIGS. 6 and 7A-7B, respectively, U-shaped, spiral shaped, and/or as one or more other shapes as would be understood by those skilled in the relevant art. In operation, the electrical length of the filter element(s) 120 can be adjusted to tune the filter element(s) to a frequency and/or a frequency range to be filtered.

In an exemplary aspect, one or more of the filter elements 120 are electrically connected to the wireless charging coil 112. The filter element(s) 120 can be, for example, inductively, capacitively, and/or galvanically coupled/connected to the wireless charging coil 112. The connection/coupling of the filter element(s) 120 is not limited to these example connection types, and the filter element(s) 120 can be connected/coupled by other configurations as would be understood by one of ordinary skill in the relevant arts. In FIG. 1A, the filter elements 120 are galvanically connected to the wireless charging coil 112, but are not limited to this connection type. Similarly, as discussed in detail below, filter elements 220 can be galvanically connected to the wireless charging coil 112 via galvanic connections 225.

In exemplary aspects including two or more filter elements 120, the two or more filter elements can be electrically coupled/connected to each other. For example, the filter elements 120 can be electrically connected via a connection (e.g., 332 in FIG. 3) and/or inductively, galvanically, and/or capacitively coupled/connected to each other. The connection/coupling of the filter element 120 is not limited to these example connection types, and the filter elements 120 can be connected/coupled using other configurations as would be understood by one of ordinary skill in the relevant arts.

FIG. 1B illustrates a top view of wireless power system 101 according to an exemplary aspect of the present disclosure. The wireless power system 101 is similar to the wireless power system 100 and discussion of common elements and/or functions are omitted for brevity.

In an exemplary aspect, the filter elements 120 can be electrically connected to the wireless charging coil 112. In this example, the filter element(s) 120 are spaced from the wireless charging coil 112 and inductively and/or capacitively coupled/connected to the wireless charging coil 112.

As illustrated in FIG. 1B, the one or more of the filter elements 120 has an electrical length $L_E=\lambda/4$. In this example, the filter element 120A and/or filter element 120B are L-shaped, where one or both of the extending portions of the L-shaped filter element has an electrical length of $\lambda/4$. In operation, the electrical length of the filter element(s) 120 can be adjusted to tune the filter element(s) 120 to a frequency and/or a frequency range to be filtered. In an exemplary aspect, the electrical length can be, for example, a multiple of $\lambda/4$, such as, $\lambda/4$, $\lambda/2$, $3\lambda/4$, etc. The electrical length is not limited to these electrical lengths, and the filter element can have another electrical length as would be understood by those skilled in the relevant arts.

In an exemplary aspect, one or more of the filter elements 120 can include a filter portion 121 and a coupling portion 122. As illustrated in FIG. 1B, the coupling portion 122 extends parallel (or substantially parallel) to a feed line portion 113 of the wireless charging coil 112. The coupling portion 122 can be configured to couple (e.g., inductively, capacitively, and/or galvanically) the filter element 120 to the wireless charging coil 112. For example, the coupling portion 122 can operate as, for example, a $\lambda/4$ coupler. The filter portion 121 of the filter element 120A can extend perpendicular (or substantially perpendicular) to the feed line portion 113. In an exemplary aspect, the filter portion 121 can extend parallel (or substantially parallel) to the driving circuit 110. The filter portion 120 can be configured to harmonics of the driving circuit 110 and/or filter one or more wireless communication signals (e.g., cellular signals) to reduce and/or prevent the wireless communication signals from interfering with the driving circuit 110.

Figure 2:
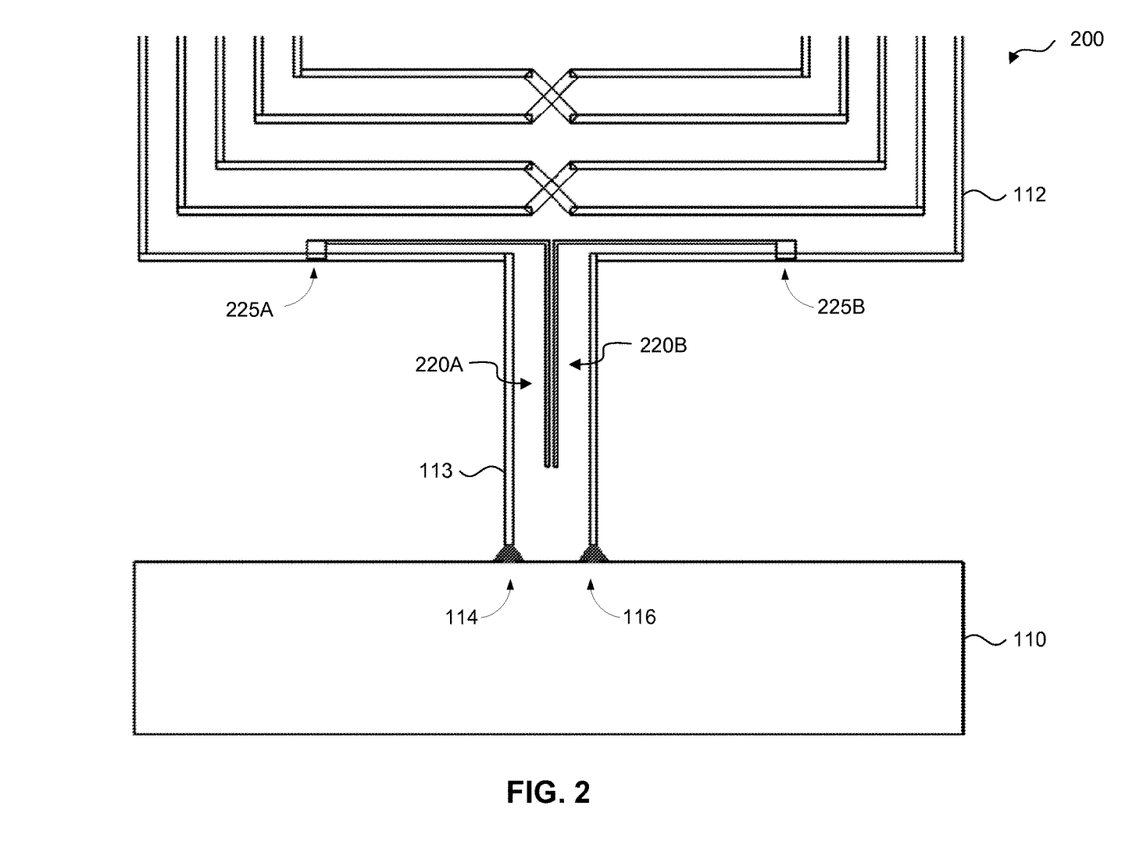
FIG. 2 illustrates a top view of a wireless power system according to an exemplary aspect of the present disclosure.

FIG. 2 illustrates a top view of wireless power system 200 according to an exemplary aspect of the present disclosure. The wireless power system 200 is similar to the wireless power systems 100 and 101, and discussion of common elements and/or functions is omitted for brevity.

The wireless power system 200 can include one or more filter elements 220. As illustrated in FIG. 2, the wireless power system 200 includes filter elements 220A and 220B, but is not limited to having two filter elements. The filter element(s) 220 can be exemplary aspects of filter element(s) 120.

In an exemplary aspect, the filter element(s) 220 are disposed adjacent to the wireless charging coil 112. Further, the filter element(s) 220 can be disposed within the wireless charging coil 112 as illustrated in FIG. 2. In operation, the wireless charging coil 112 can be disposed in a plane, where one or more of the filter elements 220 are also disposed in the plane. Alternatively, one or more of the filter elements can be positioned below or above the plane. In these examples, the filter element(s) 220 can be positioned within the borders of the wireless charging coil 112 as illustrated in FIG. 2.

In an exemplary aspect, the filter element(s) 220 are L-shaped filter element, with one extending portion being positioned adjacent to the portion of the wireless charging coil 112 extending from the driving circuit 110 (e.g., feed line portion 113) and the other extending portion of the L-shaped filter element 220 being positioned adjacent to at least a portion of the coil structure of the wireless charging coil 112.

In an exemplary aspect, the filter element(s) can be electrically connected to the wireless charging coil 112. For example, the filter element(s) 220 can be galvanically coupled/connected to the wireless charging coil 112 via galvanic connections 225. In other exemplary aspects, the filter element(s) 220 can be capacitively and/or inductively coupled/connected to the wireless charging coil 112.

Figure 3:
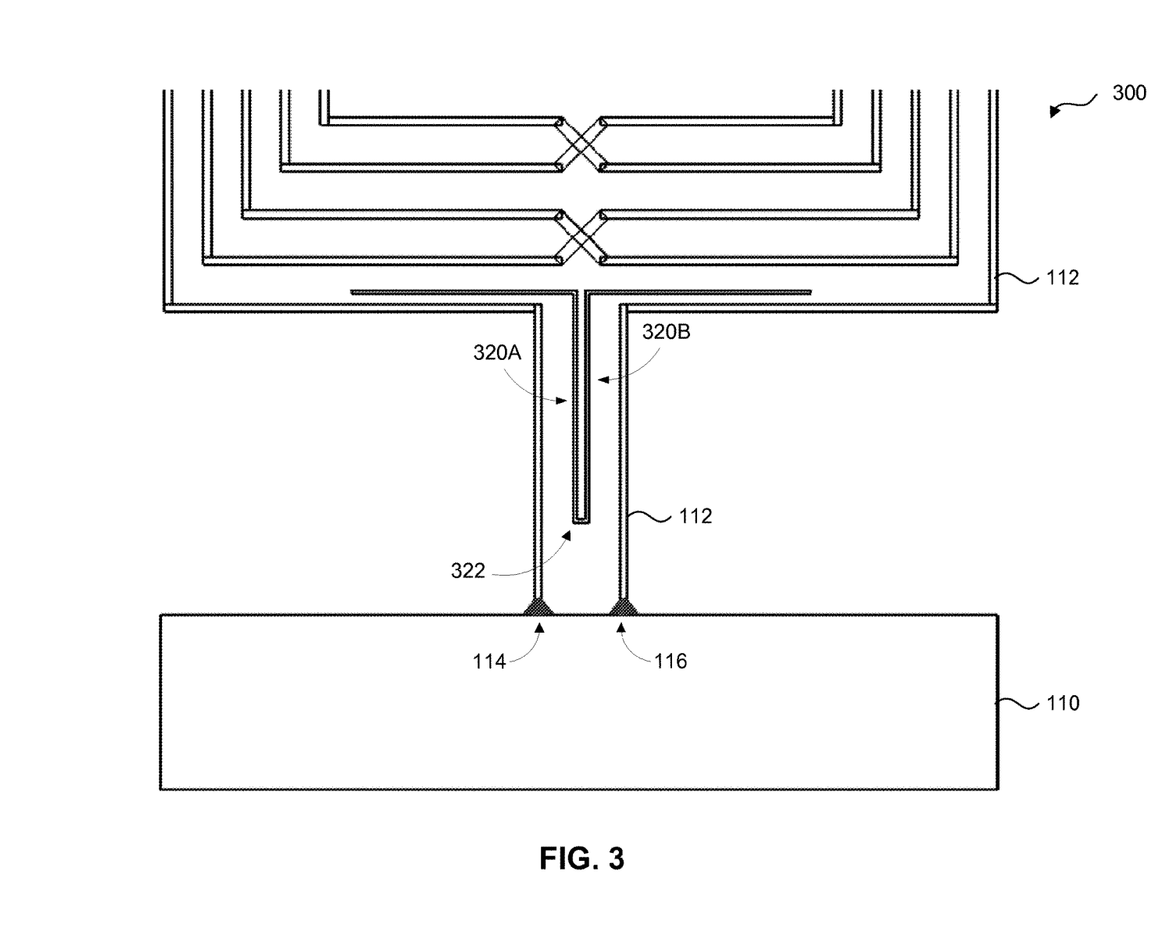
FIG. 3 illustrates a top view of a wireless power system according to an exemplary aspect of the present disclosure.

FIG. 3 illustrates a top view of wireless power system 300 according to an exemplary aspect of the present disclosure. The wireless power system 300 is similar to the wireless power systems 100, 101, and 200, and discussion of common elements and/or functions is omitted for brevity.

The wireless power system 300 can include one or more filter elements 320. As illustrated in FIG. 3, the wireless power system 300 includes filter elements 320A and 320B, but is not limited to having two filter elements. The filter element(s) 320 can be exemplary aspects of filter element(s) 120 and/or 220.

In exemplary aspects having a multiple filter elements 320, two or more of the filter elements 320 can be electrically connected together. For example, filter elements 320A and 320B are connected together via connection 322.

Figure 4:
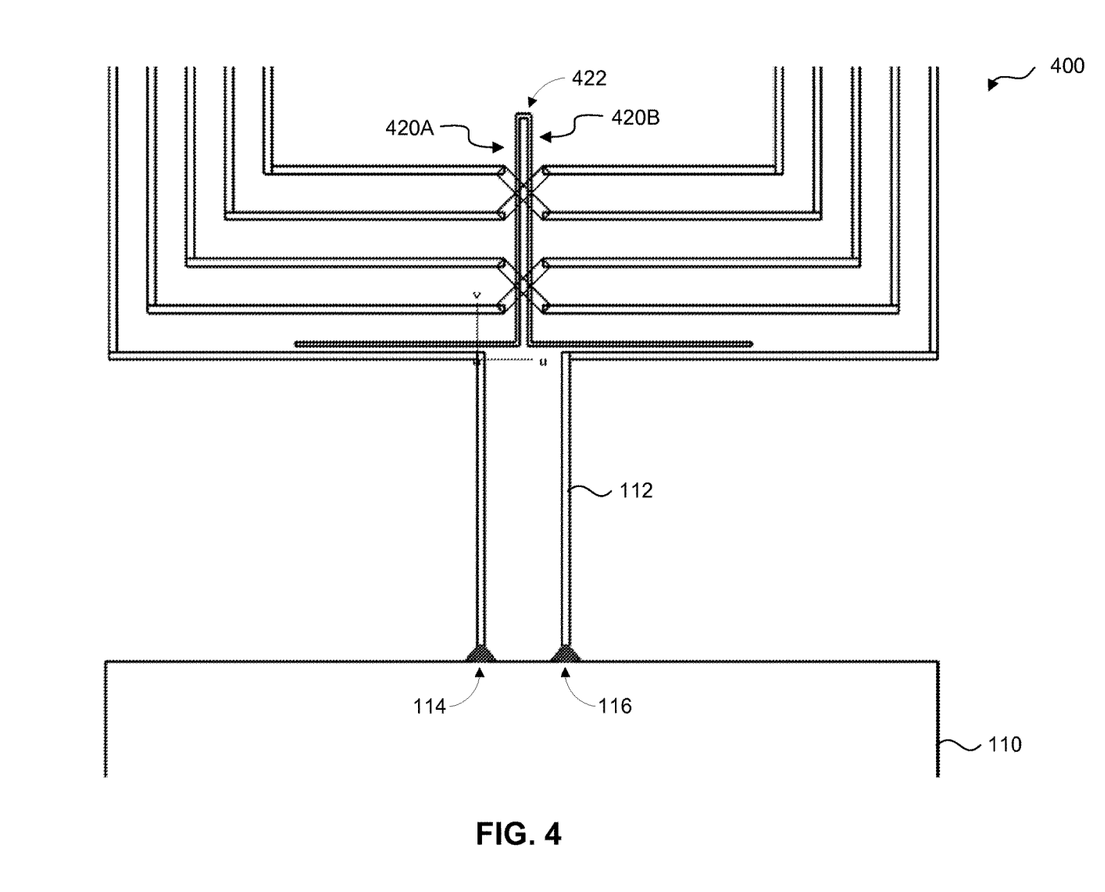
FIG. 4 illustrates a top view of a wireless power system according to an exemplary aspect of the present disclosure.

FIG. 4 illustrates a top view of wireless power system 400 according to an exemplary aspect of the present disclosure. The wireless power system 400 is similar to the wireless power systems 100, 101, 200 and 300, and discussion of common elements and/or functions is omitted for brevity.

The wireless power system 400 can include one or more filter elements 420. As illustrated in FIG. 4, the wireless power system 400 includes filter elements 420A and 420B, but is not limited to having two filter elements. The filter element(s) 420 can be exemplary aspects of filter element(s) 120, 220, and/or 320.

Similar to the filter elements 320 illustrated in FIG. 3, two or more of the filter elements 420 can be electrically connected together. For example, filter elements 420A and 420B are connected together via connection 422.

In an exemplary aspect, the filter element(s) 420 are disposed within the wireless charging coil 112. For example, the filter element(s) 420 can be L-shaped, with a first extending portion being positioned adjacent to a portion of the wireless charging coil 112 forming the exterior of the coil structure, and a second extending portion extending across one or more interior portions of the coil structure of the wireless charging coil 112. In this example, the first extending portion can be substantially parallel to the portion of the wireless charging coil 112 and the second extending portion can extend substantially perpendicular to the portion of the wireless charging coil 112. For example, as illustrated in FIG. 4, an extending portion of the filter element 420A and an extending portion of the filter element 420B extend towards the interior (e.g., the center) of the wireless charging coil 112. In this example, the filter elements 420A and 420B are connected together via connection 422. Further, as illustrated in FIG. 4, the second extending portion of the filter element 420 can extend across one or more coils of the wireless charging coil 112 while the first extending portion extends between two adjacent coils of the wireless charging coil 112.

In this example, the wireless charging coil 112 can be disposed in a plane, where one or more of the filter elements 420 (or one or more portions thereof) are also disposed in the plane. Alternatively, one or more of the filter elements can be positions below or above the plane. For example, at least the portions of the filter elements 420 crossing the coil structure of the wireless charging coil 112 can be positioned above/below, and spaced from the wireless charging coil 112.

Figure 5A:
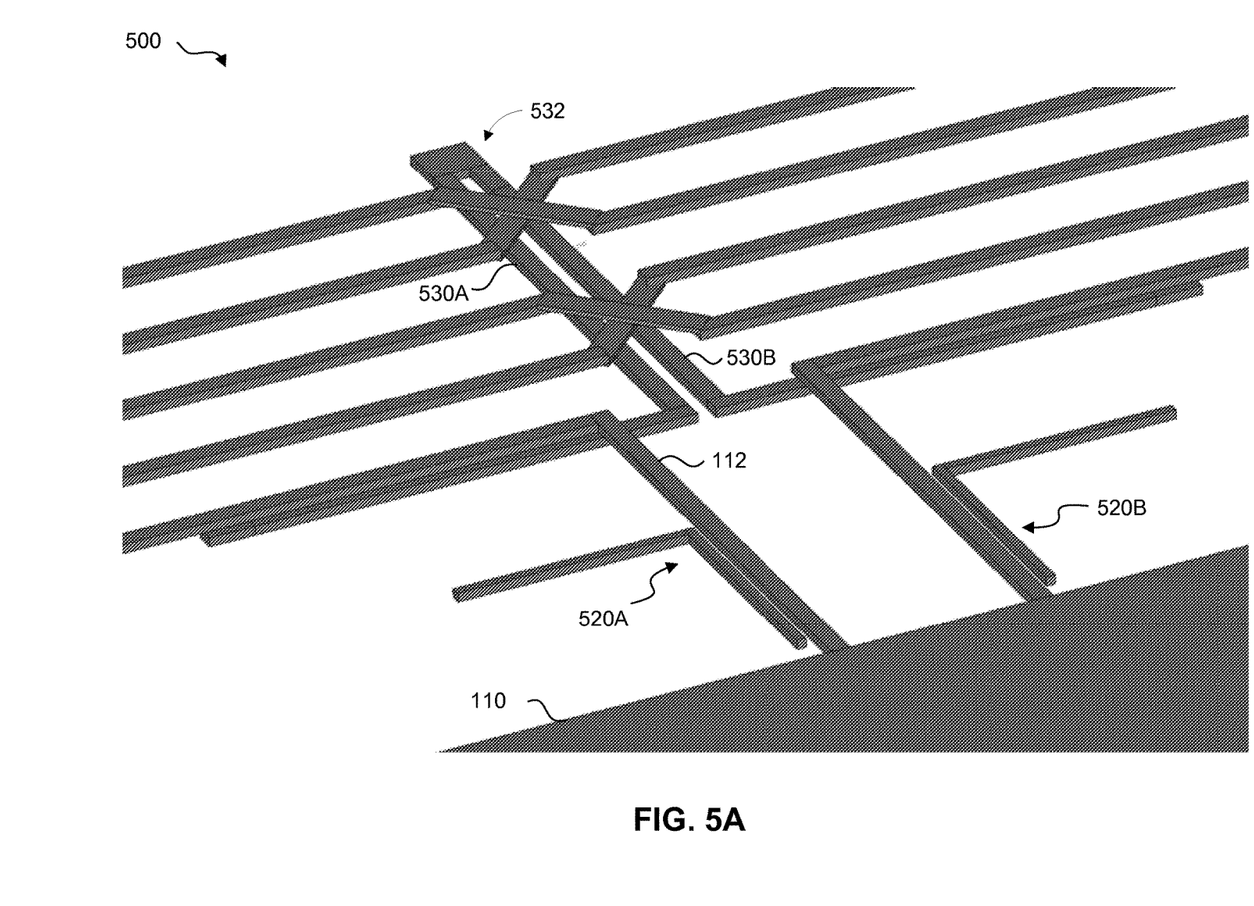
FIG. 5A illustrates a top perspective view of a wireless power system according to an exemplary aspect of the present disclosure.
Figure 5B:
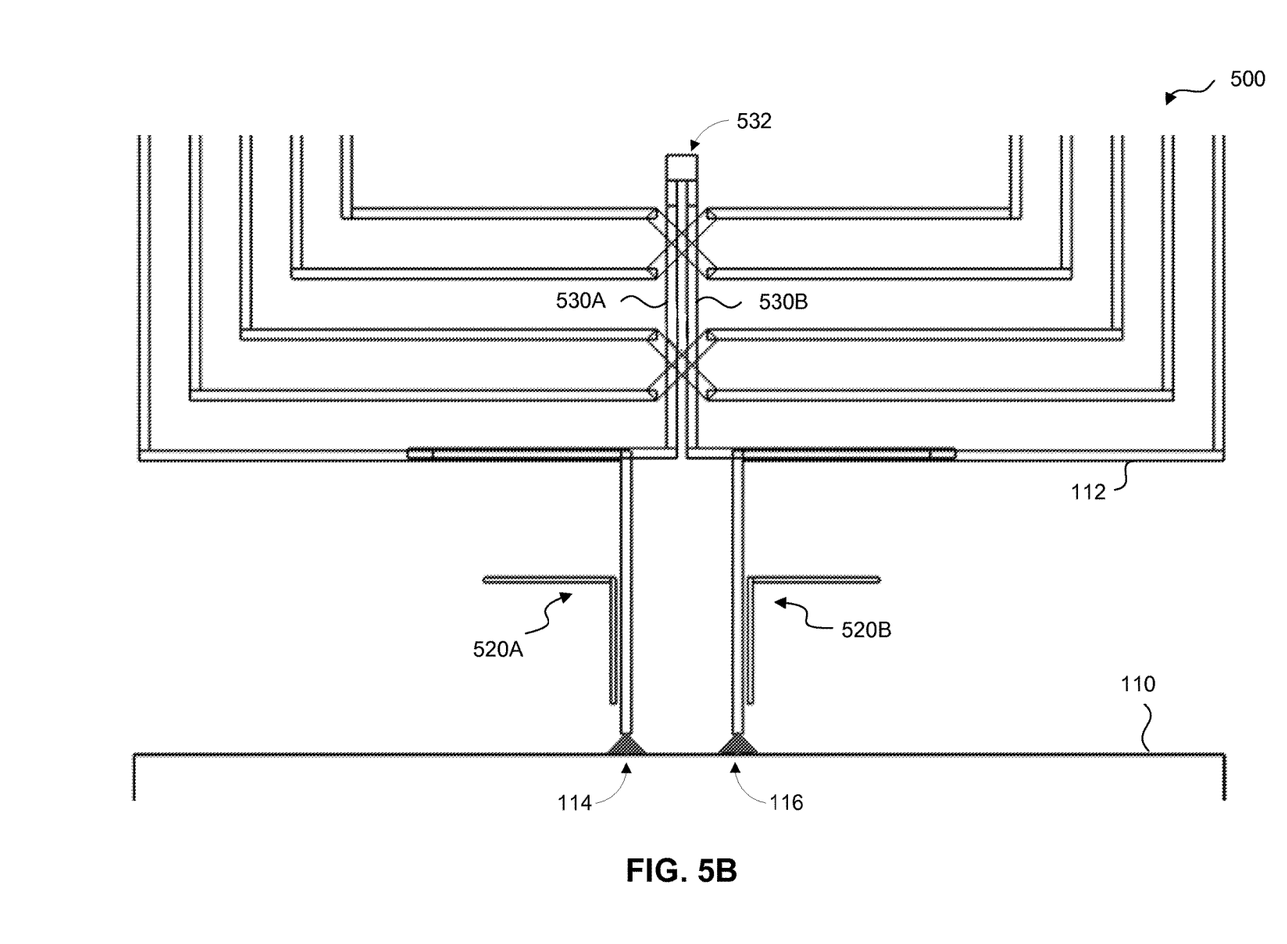
FIG. 5B illustrates a top view of the wireless power system of FIG. 5A.

FIGS. 5A-B illustrate wireless power system 500 according to an exemplary aspect of the present disclosure. FIG. 5A illustrates a top perspective view of the wireless power system 500 and FIG. 5B illustrates a top view of the wireless power system 500. The wireless power system 500 is similar to the wireless power systems 100, 101, 200, 300 and 400, and discussion of common elements and/or functions is omitted for brevity.

The wireless power system 500 can include one or more filter elements 520 and one or more filter elements 530. The filter element(s) 520 and/or 530 can be exemplary aspects of filter element(s) 120, 220, 320, and/or 420.

In an exemplary aspect, wireless power system 500 can include a multi-resonance filter structure, where the filter element(s) 520 and the filter element(s) 530 can be configured to have different resonance frequencies. For example, the filter elements 520 can be configured as high band filters while the filter element 530 can be configured as low band filters. The filter elements 520 and 530 can be tuned independently from each other.

In an exemplary aspect, the filter element(s) 520 can be disposed adjacent to the portion of the wireless charging coil 112 extending from the driving circuit 110 to the coil structure of the wireless charging coil 112, but is not limited to this configuration. The filter element(s) 530 can be disposed within the wireless charging coil 112. For example, the filter element(s) 530 can be L-shaped, with one extending portion being positioned adjacent to (or below/above) a portion of the wireless charging coil 112 forming the exterior of the coil structure, and the other extending portion extending across one or more interior portions of the coil structure of the wireless charging coil 112. For example, as illustrated in FIGS. 5A-5B, an extending portion of the filter element 530A and an extending portion of the filter element 530B extend towards the interior (e.g., the center) of the wireless charging coil 112. In this example, the filter elements 530A and 530B can be connected together via connection 532.

Figure 6:
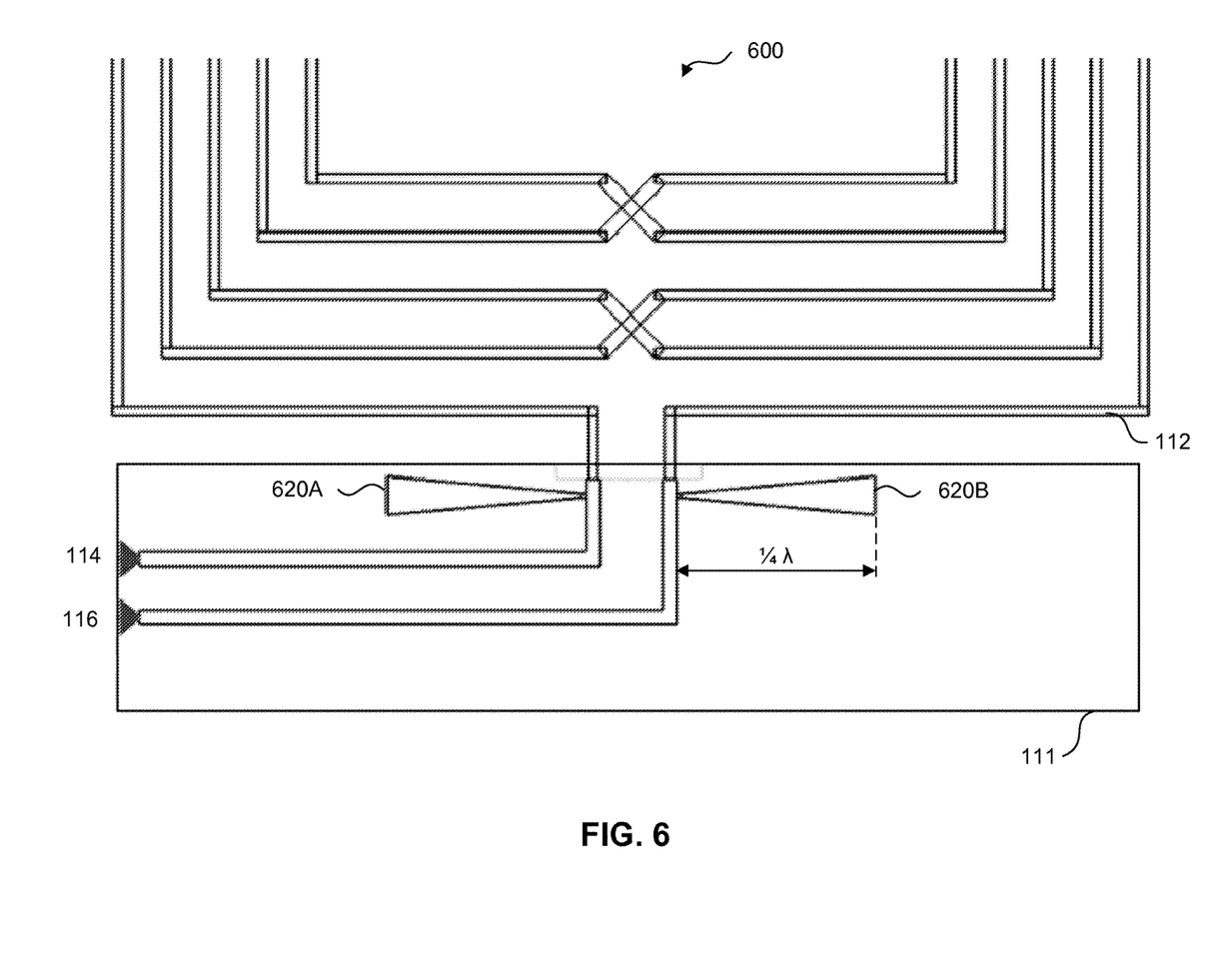
FIG. 6 illustrates a top view of a wireless power system according to an exemplary aspect of the present disclosure.
Figure 7:
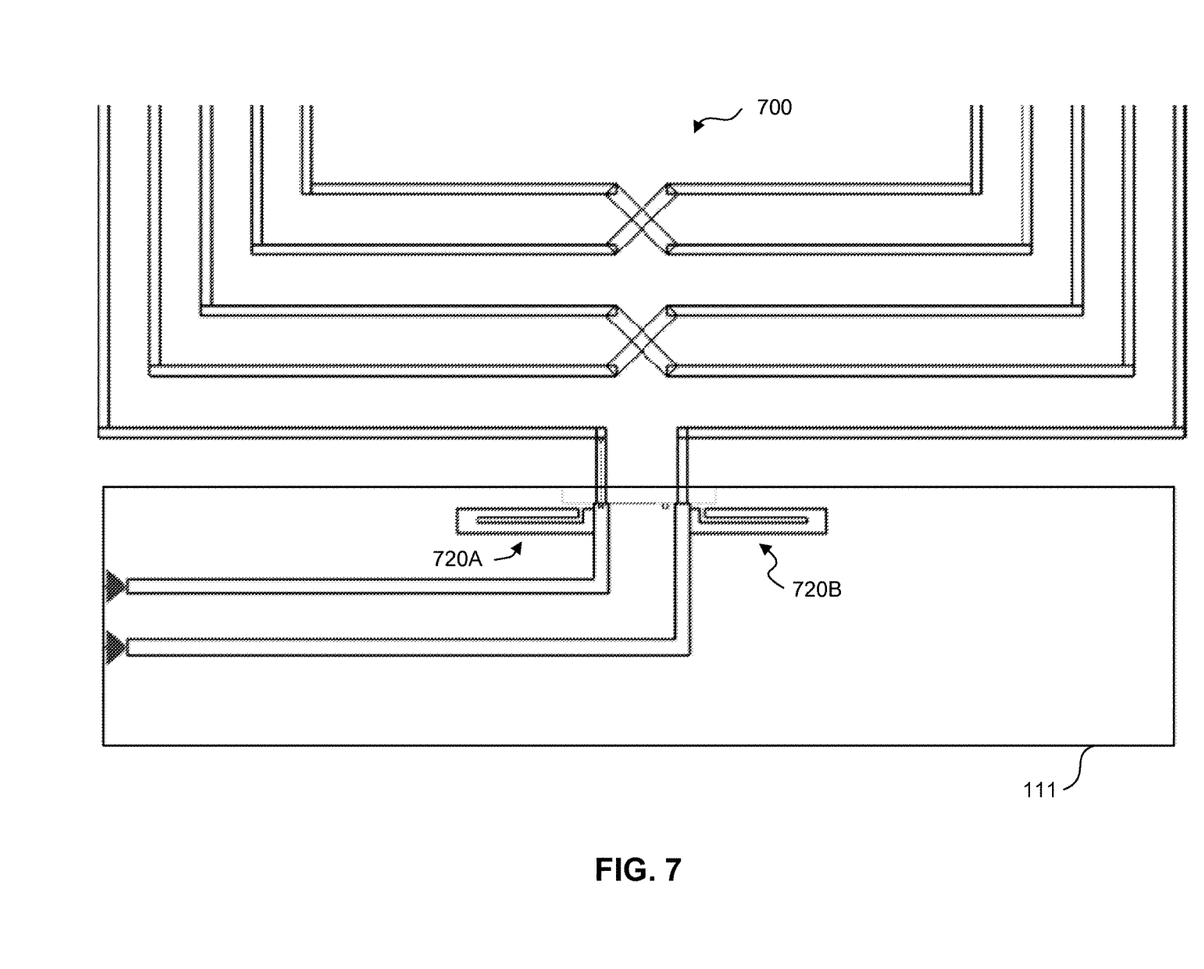
FIG. 7 illustrates a top view of a wireless power system according to an exemplary aspect of the present disclosure.

FIG. 6 illustrates a top view of wireless power system 600 according to an exemplary aspect of the present disclosure. The wireless power system 600 is similar to the wireless power systems 100, 101, 200, 300, 400 and 500, and discussion of common elements and/or functions is omitted for brevity.

The wireless power system 600 can include one or more filter elements 620. As illustrated in FIG. 6, the wireless power system 600 includes filter elements 620A and 620B, but is not limited to having two filter elements. The filter element(s) 620 can be exemplary aspects of filter element(s) 120, 220, 320, 420, 520, and/or 530.

In an exemplary aspect, the filter element(s) 620 are triangular shaped, but are not limited this configuration and can have a different shape as would be understood by those skilled in the relevant arts. In an exemplary aspect, the shape and/or electrical length can be adjusted to tune the filter element(s) 620 to a frequency and/or a frequency range to be filtered. For example, the filter element(s) 620 can have an electrical length of $\lambda/4$, $\lambda/2$, $3\lambda/4$, or another electrical length as would be understood by those skilled in the relevant arts. In an exemplary aspect, the electrical length is a multiple of $\lambda/4$ (e.g., $\lambda/4$, $\lambda 2$, $3\lambda/4$, etc.).

In an exemplary aspect, and as illustrated in FIG. 6, the wireless power system 600 can include a printed circuit board (PCB) 111. In an exemplary aspect, the filter element(s) 620 can be disposed on the PCB 111 and connected to feeds 114 and 116. As illustrated in FIG. 6, the filter element(s) 620 can be positioned between the feeds 114, 116 and the wireless charging coil 112. The PCB 111 can also include processor circuitry configured to perform power management operations, impedance matching, and/or control and management communications with a power transfer unit.

FIG. 7 illustrates a top view of wireless power system 700 according to an exemplary aspect of the present disclosure. The wireless power system 700 is similar to the wireless power systems 100, 101, 200, 300, 400, 500 and 600, and discussion of common elements and/or functions is omitted for brevity.

The wireless power system 700 can include one or more filter elements 720. As illustrated in FIG. 7, the wireless power system 700 includes filter elements 720A and 720B disposed on PCB 111, but is not limited to having two filter elements. The filter element(s) 720 can be exemplary aspects of filter element(s) 120, 220, 320, 420, 520, 530 and/or 620.

In an exemplary aspect, the filter element(s) 720 have a bent structure that includes a second portion of the filter element 720 being bent and folded back upon a first portion of the filter element 720. The bent structure can have a total electrical length of $\lambda/4$. For example, the first portion of the filter element 720 can have an electrical length of $\lambda/8$ and the second portion of the filter element 720 can have an electrical length of $\lambda/8$, where the first and second portions together have an electrical length of $\lambda/4$. The various portions of the filter element 720 are not limited to having the same electrical lengths, and the portions of the filter elements can different lengths whose total electrical length is $\lambda/4$. The filter element 720 is not limited to these structural configurations and/or electrical lengths. The filter element 720 can have other structural configurations and/or electrical lengths as would be understood by those skilled in the relevant arts. For example, the electrical length can be a multiple of $\lambda/4$ (e.g., $\lambda/4$, $\lambda/2$, $3\lambda/4$, etc.).

In an exemplary aspect, the filter elements 120, 220, 320, 420, 520, 530, 620, and/or 720 can be disposed on, for example, a PCB (e.g., PCB 111). The PCB can be formed of, for example, glass reinforced epoxy laminate (e.g., FR-4) or one or more other materials as would be understood by one of ordinary skill in the relevant arts. For example, the filter elements can be a wire, trace, and/or a conductive plane on or within the PCB. In an exemplary aspect, the filter elements 120, 220, 320, 420, 520, 530, 620, and/or 720 can be configured as a slot structure to a PCB ground plane.

In an exemplary aspect, the filter elements 120, 220, 320, 420, 520, 530, 620, and/or 720 can be formed as part of an external and/or interior enclosure of a device implementing one or more of the wireless power systems discussed herein.

In an exemplary aspect, the filter elements 120, 220, 320, 420, 520, 530, 620, and/or 720 can be formed between the wireless charging coil 112 and ground. In this example, the wireless charging coil 112 can be grounded via the filter element.

The wireless charging coil 112 is not limited to the structural configurations described and illustrated herein. The wireless charging coil 112 can be configured as one or more other shapes and/or configurations as would be understood by those skilled in the relevant arts.

One or more of the exemplary aspects can be similarly implemented in the device(s) configured as power receiving units (PRUs) in addition to, or as an alternative to the wireless power systems discussed herein.

Figure 8A:
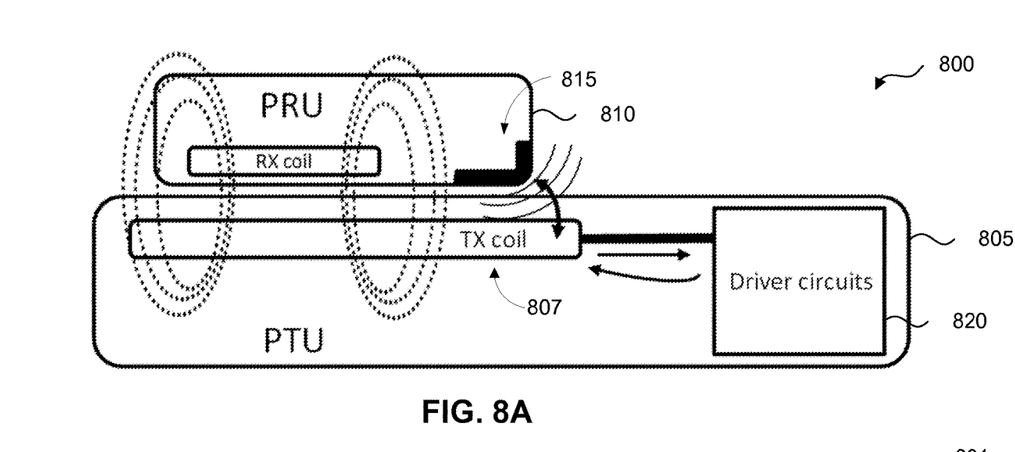
FIGS. 8A and 8B illustrate wireless power systems according to exemplary aspects of the present disclosure.
Figure 8B:
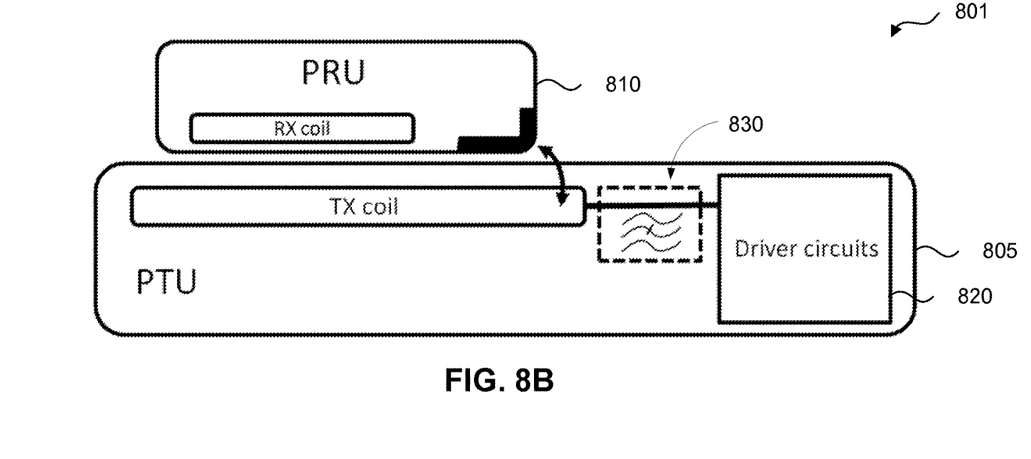

FIGS. 8A and 8B illustrate wireless power systems 800 and 801 according to exemplary aspects of the present disclosure. The wireless power system 800 illustrates the RF coupling from an antenna 815 (e.g., a cellular antenna) of a power receiving unit (PRU) 810 (e.g., a mobile wireless communication device). The RF signal from the antenna 815 can be coupled to the driver circuit 820 of the power transmitting unit (PRU) 805 via the transmission coil 807. Further, FIG. 8A illustrates noise and/or harmonics from the driver circuit 820 can couple to the antenna 815 of the PRU 810 via the transmission coil 807.

By including a filter element 830 between the driver circuit 820 and the transmission coil 807 as illustrated in FIG. 8B, the coupling of signals from the antenna 815 to the driver circuit 820, and/or the coupling of noise and/or harmonics from the driver circuit 820 to the antenna 815 can be reduced and/or eliminated. The filter element 830 can be an exemplary aspect of one or more of the filter elements 120, 220, 320, 420, 520, 530, 620, and/or 720.

EXAMPLES

Example 1 is a wireless power system, comprising: a wireless charging coil; a driving circuit connected to the wireless charging coil and configured to drive the wireless charging coil at a power transmission frequency; and a filter element coupled to the wireless charging coil, the filter element being configured to filter one or more interference signal components from the wireless power system.

In Example 2, the subject matter of Example 1, wherein an electrical length of the filter element is tuned to create resonance having band-stop characteristics for filtering the one or more interference signal components.

In Example 3, the subject matter of Example 2, wherein the electrical length of the filter element is a quarter of a wavelength of the one or more interference signal components or a multiple thereof.

In Example 4, the subject matter of Example 1, wherein the filter element is an electrically conductive trace, wire, or plane formed adjacent to the wireless charging coil.

In Example 5, the subject matter of Example 1, wherein the filter element: is L-shaped, is triangular shaped, or comprises a first portion and a second portion, the second portion being bent back along and adjacent to the first portion.

In Example 6, the subject matter of Example 1, wherein the filter element comprises:
a filter portion configured to filter the one or more interference signal components; and a coupling portion configured to couple the filter element to the wireless charging coil.

In Example 7, the subject matter of Example 1, wherein the filter element comprises a slot structure to a ground plane.

In Example 8, the subject matter of Example 1, wherein the filter element is inductively, capacitively, or galvanically coupled to the wireless charging coil.

In Example 9, the subject matter of Example 1, wherein the filter element comprises a first filter element and a second filter element, a portion of the first filter element extending substantially parallel to a portion of the second filter element.

In Example 10, the subject matter of Example 9, wherein the portion of the first filter element is connected to the portion of the second filter element.

In Example 11, the subject matter of Example 1, wherein the filter element comprises a first portion and a second portion, the first portion being adjacent to, and extending substantially parallel with a portion of the wireless charging coil, and the second portion extending substantially perpendicular to the portion of the wireless charging coil.

In Example 12, the subject matter of Example 1, further comprising a second filter element coupled to the wireless charging coil, wherein the filter element is configured to filter a first interference signal component of the one or more interference signal components and the second filter element is configured to filter a second interference signal component of the one or more interference signal components that is different from the first interference signal component.

Example 13 is a wireless power system, comprising: a wireless charging coil; a driving circuit connected to the wireless charging coil and configured to drive the wireless charging coil at a power transmission frequency; a first filter element coupled to the wireless charging coil, the first filter element being configured to filter a first interference signal component from the wireless power system; and a second filter element coupled to the wireless charging coil, the second filter element being configured to filter a second interference signal component from the wireless power system.

In Example 14, the subject matter of Example 13, wherein an electrical length of the first filter element is a quarter of a wavelength of the first interference signal component, and wherein an electrical length of the second filter element is a quarter of a wavelength of the second interference signal component.

In Example 15, the subject matter of Example 13, wherein at least one of the first filter element and the second filter element is an electrically conductive trace, wire, or plane formed adjacent to the wireless charging coil.

In Example 16, the subject matter of Example 13, wherein the first filter element or the second filter element: is L-shaped; is triangular shaped; or comprises a first portion and a second portion, the second portion being bent back along and adjacent to the first portion.

In Example 17, the subject matter of Example 13, wherein the first filter element or the second filter element is inductively, capacitively, or galvanically coupled to the wireless charging coil.

In Example 18, the subject matter of Example 13, wherein: the first filter element is positioned within an interior portion of the wireless charging coil defined by a coil structure of the wireless charging coil; and the second filter element is positioned along an exterior of the coil structure of the wireless charging coil.

Example 19 is a wireless power system, comprising: a wireless charging coil; and a filter element coupled to the wireless charging coil, the filter element being configured to filter one or more interference signal components from the wireless power system.

In Example 20, the subject matter of Example 19, wherein an electrical length of the filter element is a quarter of a wavelength of the one or more interference signal components.

In Example 21, the subject matter of Example 19, wherein an electrical length of the filter element is tuned to create resonance having band-stop characteristics for filtering the one or more interference signal components.

In Example 22, the subject matter of Example 19, wherein the filter element comprises: a filter portion configured to filter the one or more interference signal components; and a coupling portion configured to couple the filter element to the wireless charging coil.

In Example 23, the subject matter of Example 22, wherein the filter portion extends substantially perpendicular to the coupling portion.

In Example 24, the subject matter of Example 22, wherein the coupling portion extends substantially parallel to a feed line of the wireless charging coil and the filter portion extends substantially parallel to a driving circuit configured to drive the wireless charging coil.

In Example 25, the subject matter of any of Examples 1 and 4-12, wherein an electrical length of the filter element is tuned to create resonance having band-stop characteristics for filtering the one or more interference signal components.

In Example 26, the subject matter of Example 25, wherein the electrical length of the filter element is a quarter of a wavelength of the one or more interference signal components or a multiple thereof.

In Example 27, the subject matter of any of Examples 1-11, further comprising a second filter element coupled to the wireless charging coil, wherein the filter element is configured to filter a first interference signal component of the one or more interference signal components and the second filter element is configured to filter a second interference signal component of the one or more interference signal components that is different from the first interference signal component.

Example 28 is a wireless power system, comprising: a wireless charging means; a driving means connected to the wireless charging means, the driving means for driving the wireless charging means at a power transmission frequency; and a filtering means coupled to the wireless charging means, the filtering means for filtering one or more interference signal components from the wireless power system.

In Example 29, the subject matter of Example 28, wherein the filtering means is an electrically conductive trace, wire, or plane formed adjacent to the wireless charging coil.

In Example 30, the subject matter of Example 28, wherein the filtering means: is L-shaped, is triangular shaped, or comprises a first portion and a second portion, the second portion being bent back along and adjacent to the first portion.

In Example 31, the subject matter of Example 28, wherein the filtering means comprises: a filter portion for filtering the one or more interference signal components; and a coupling portion for coupling the filtering means to the wireless charging means.

In Example 32, the subject matter of Example 28, wherein the filtering means comprises a slot structure to a ground plane.

In Example 33, the subject matter of Example 28, wherein the filtering means is inductively, capacitively, or galvanically coupled to the wireless charging means.

In Example 34, the subject matter of Example 28, wherein the filtering means comprises a first filter element and a second filter element, a portion of the first filter element extending substantially parallel to a portion of the second filter element.

In Example 35, the subject matter of Example 34, wherein the portion of the first filter element is connected to the portion of the second filter element.

In Example 36, the subject matter of Example 28, wherein the filtering means comprises a first portion and a second portion, the first portion being adjacent to, and extending substantially parallel with a portion of the wireless charging coil, and the second portion extending substantially perpendicular to the portion of the wireless charging coil.

In Example 37, the subject matter of any of Examples 28-36, further comprising a second filtering means coupled to the wireless charging means, wherein the filtering means is for filtering a first interference signal component of the one or more interference signal components and the second filtering means is for filtering a second interference signal component of the one or more interference signal components that is different from the first interference signal component.

In Example 38, the subject matter of any of Examples 28-37, wherein an electrical length of the filtering means is tuned to create resonance having band-stop characteristics for filtering the one or more interference signal components.

In Example 39, the subject matter of Example 38, wherein the electrical length of the filtering means is a quarter of a wavelength of the one or more interference signal components or a multiple thereof.

Example 40 is an apparatus substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A wireless power system, comprising:
   a wireless charging coil;
   a driving circuit connected to the wireless charging coil via a feed line, and configured to drive the wireless charging coil at a power transmission frequency; and
   a filter element spaced from the feed line and coupled to the wireless charging coil, the filter element being configured to filter one or more interference signal components from the wireless power system, wherein a portion of the filter element extends along the feed line between the wireless charging coil and the drive circuit.

2. The wireless power system of claim 1, wherein an electrical length of the filter element is tuned to create resonance having band-stop characteristics for filtering the one or more interference signal components.

3. The wireless power system of claim 2, wherein the electrical length of the filter element is a quarter of a wavelength of the one or more interference signal components or a multiple thereof.

4. The wireless power system of claim 1, wherein the filter element is an electrically conductive trace, wire, or plane formed adjacent to the wireless charging coil.

5. The wireless power system of claim 1, wherein the filter element:
is L-shaped,
is triangular shaped, or
comprises a first portion and a second portion, the second portion being bent back along and adjacent to the first portion.

6. The wireless power system of claim 1, wherein the filter element comprises:
a filter portion configured to filter the one or more interference signal components; and
a coupling portion configured to couple the filter element to the wireless charging coil.

7. The wireless power system of claim 1, wherein the filter element comprises a slot structure to a ground plane.

8. The wireless power system of claim 1, wherein the filter element is inductively, capacitively, or galvanically coupled to the wireless charging coil.

9. The wireless power system of claim 1, wherein the filter element comprises a first filter element and a second filter element, a portion of the first filter element extending substantially parallel to a portion of the second filter element.

10. The wireless power system of claim 9, wherein the portion of the first filter element is connected to the portion of the second filter element.

11. The wireless power system of claim 1, wherein the filter element further comprises another portion, the other portion being adjacent to, and extending substantially parallel with a portion of the wireless charging coil, and the portion extending substantially perpendicular to the portion of the wireless charging coil.

12. The wireless power system of claim 1, further comprising a second filter element coupled to the wireless charging coil, wherein the filter element is configured to filter a first interference signal component of the one or more interference signal components and the second filter element is configured to filter a second interference signal component of the one or more interference signal components that is different from the first interference signal component.

13. A wireless power system, comprising:
a wireless charging coil;
a driving circuit connected to the wireless charging coil via a feed line, and configured to drive the wireless charging coil at a power transmission frequency;
a first filter element spaced from the feed line and coupled to the wireless charging coil, the first filter element being configured to filter a first interference signal component from the wireless power system; and
a second filter element spaced from the feed line and coupled to the wireless charging coil, the second filter element being configured to filter a second interference signal component from the wireless power system, wherein respective portions of the first and the second filter elements extend along the feed line between the wireless charging coil and the drive circuit.

14. The wireless power system of claim 13, wherein an electrical length of the first filter element is a quarter of a wavelength of the first interference signal component, and wherein an electrical length of the second filter element is a quarter of a wavelength of the second interference signal component.

15. The wireless power system of claim 13, wherein at least one of the first filter element and the second filter element is an electrically conductive trace, wire, or plane formed adjacent to the wireless charging coil.

16. The wireless power system of claim 13, wherein the first filter element or the second filter element:
is L-shaped;
is triangular shaped; or
comprises a first portion and a second portion, the second portion being bent back along and adjacent to the first portion.

17. The wireless power system of claim 13, wherein the first filter element or the second filter element is inductively, capacitively, or galvanically coupled to the wireless charging coil.

18. The wireless power system of claim 13, wherein:
the first filter element is positioned within an interior portion of the wireless charging coil defined by a coil structure of the wireless charging coil; and
the second filter element is positioned along an exterior of the coil structure of the wireless charging coil.

19. The wireless power system of claim 6, wherein the filter portion extends substantially perpendicular to the coupling portion.

20. The wireless power system of claim 6, wherein the coupling portion extends substantially parallel to a feed line of the wireless charging coil and the filter portion extends substantially parallel to a driving circuit configured to drive the wireless charging coil.

21. The wireless power system of claim 11, wherein the portion of the filter element extends substantially parallel to the feed line.

22. The wireless power system of claim 1, further comprising another feed line that connects the driving circuit to the wireless charging coil, wherein the portion of the filter element is disposed in an area between the two feed lines.

23. The wireless power system of claim 1, further comprising another feed line that connects the driving circuit to the wireless charging coil, wherein the portion of the filter element is disposed outside an area between the two feed lines.

24. The wireless power system of claim 1, wherein the filter element is separate from the feed line.

25. The wireless power system of claim 1, wherein the portion of the filter element extends parallel to the feed line.

26. The wireless power system of claim 1, wherein the filter element is separate from the feed line and extends parallel to the portion of the feed line.

27. The wireless power system of claim 1, wherein the filter element is wireless coupled to the feed line.

28. The wireless power system of claim 27, wherein the wireless coupling is inductive coupling or capacitive coupling.

29. The wireless power system of claim 1, wherein an electrical length of the filter element is a fraction of a wavelength of the one or more interference signal components.

* * * * *